Patented Sept. 8, 1925.

1,553,014

UNITED STATES PATENT OFFICE.

PAUL VIRCK, OF DESSAU IN ANHALT, GERMANY, ASSIGNOR TO ACTIEN GESELLSCHAFT FUR ANILIN FABRIKATION, OF BERLIN, GERMANY.

CONDENSATION PRODUCT CONTAINING SULPHUR.

No Drawing.  Application filed April 25, 1925. Serial No. 25,945.

*To all whom it may concern:*

Be it known that I, PAUL VIRCK, a citizen of the German Republic, residing at Dessau in Anhalt, Germany, my post-office address being Kaiserplatz 14, Dessau in Anhalt, Germany, have invented certain new and useful Improvements in Condensation Products Containing Sulphur, of which the following is a specification.

Resinous bodies obtainable by action of sulphur chloride on hydroxybenzenes have the property of being adsorbed from dilute alkaline solutions by textile fibres and other substrata and in this condition of fixing dyestuffs to produce dyeings fast to washing. They have the disadvantage, however, that they color the substratum a dirty yellow so that the dyeings obtained with acid dyestuffs are unfavorably affected in respect to their tint and clearness. A method of avoiding this objection consists in treating the sulphur containing compounds with oxidizing or reducing agents in alkaline solutions.

According to the present invention the resinous bodies containing the sulphur are converted by treatment at a raised temperature with an hydroxybenzene sulfonic acid into compounds which are colorless when adsorbed on textile fibres and act as mordants for basic dyestuffs.

The following examples illustrate the invention without limiting it, the parts being by weight:

1. 320 parts of the sulphur compound obtained by the action of 320 parts of sulphur chloride on 188 parts of phenol are melted together with 320 parts of the crude hydroxybenzene sulfonic acid obtainable by the action of one molecular proportion of fuming sulfuric acid on one molecular proportion of phenol. The temperature is gradually raised to 160–170° C. The fused mass which is at first a mobile liquid thickens and after 1–2 hours reaction is completed. The resinous body produced dissolves easily in a solution of sodium carbonate.

2. 320 parts of the parent material used in example 1 are melted together with 640 parts of crude hydroxybenzene sulfonic acid at an increasing temperature. At 120° C. a lively reaction occurs. The temperature is maintained at 170 to 175° C. until the mass has become viscous. The body produced dissolves to a colorless solution in sodium carbonate solution.

What I claim is,—

1. Colorless compounds containing sulphur capable of being adsorbed by textile fibres and other substrata obtained by treating with an hydroxybenzene sulfonic acid at a raised temperature a resinous body obtainable by the action of sulphur chloride on an hydroxybenzene.

2. Colorless compounds containing sulphur capable of being adsorbed by textile fibres and other substrata obtained by treating with a crude hydroxybenzene sulfonic acid at a raised temperature a resinous body obtainable by the action of sulphur chloride on an hydroxybenzene.

3. Colorless compounds containing sulphur capable of being adsorbed by textile fibres and other substrata obtained by treating with a crude hydroxybenzene sulfonic acid at a raised temperature the resinous body obtainable by the action of sulphur chloride on phenol.

In testimony whereof I affix my signature.

PAUL VIRCK.